United States Patent
Raddino et al.

(10) Patent No.: US 6,850,885 B2
(45) Date of Patent: Feb. 1, 2005

(54) METHOD FOR RECOGNIZING SPEECH

(75) Inventors: Daniela Raddino, München (DE); Ralf Kompe, Fellbach (DE); Thomas Kemp, Remseck (DE)

(73) Assignee: Sony International (Europe) GmbH, Berlin (DE)

( * ) Notice: Subject to any disclaimer, the term of this patent is extended or adjusted under 35 U.S.C. 154(b) by 583 days.

(21) Appl. No.: 10/021,776

(22) Filed: Dec. 12, 2001

(65) Prior Publication Data

US 2002/0116193 A1 Aug. 22, 2002

(30) Foreign Application Priority Data

Dec. 13, 2000 (EP) .............................................. 00127377

(51) Int. Cl.⁷ .......................... G10L 15/10; G10L 15/14
(52) U.S. Cl. ..................................... 704/236; 704/255
(58) Field of Search .............................. 704/236–242, 704/251–257

(56) References Cited

U.S. PATENT DOCUMENTS 5,797,123 A * 8/1998 Chou et al. ................. 704/255
6,058,363 A    5/2000 Ramalingam
6,226,612 B1 * 5/2001 Srenger et al. .............. 704/240
6,505,156 B1 * 1/2003 Junkawitsch et al. ........ 704/242

FOREIGN PATENT DOCUMENTS

EP  0 762 709   3/1997
GB  2 347 252   8/2000

OTHER PUBLICATIONS

Tsiporkova E et al: "Evaluation of Various Confidence-Based Strategies for Isolated Word Rejection" 2000 IEEE International Conference on Acoustics, Speech, and Signal Processing. Proceedings (CAT. No. 00CH37100), Proceedings of 2000 International Conference on Acoustics, Speech and Signal Processing, Istanbul, Turkey, Jun. 5–9, 2000, pp. 1819–1822, vol. 3, XP002183427.

* cited by examiner

*Primary Examiner*—David D. Knepper
(74) *Attorney, Agent, or Firm*—Frommer Lawrence & Haug LLP; William S. Frommer

(57) ABSTRACT

To increase the accuracy and the flexibility of a method for recognizing speech which employs a keyword spotting process on the basis of a combination of a keyword model (KM) and a garbage model (GM) it is suggested to associate at least one variable penalty value (Ptrans, P1, . . . , P6) with a global penalty (Pglob) so as to increase the recognition of keywords (Kj).

14 Claims, 2 Drawing Sheets

METHOD FOR RECOGNIZING SPEECH

The present invention relates to a method for recognizing speech according to the preamble of claim 1 and in particular to a method for recognizing speech using a process of penalty-based keyword spotting.

Methods for recognizing speech are often confronted with speech phrases or word sequences which are not part of a given vocabulary within a predefined language model or grammar. These out-of-vocabulary words are called garbage speech in contrast to in-vocabulary words which are called keywords for example.

In known methods for recognizing speech at least the keywords in a received speech phrase are recognized in particular by employing a keyword spotting based recognition process and a given language model. To consider the keywords as well as the out-of-vocabulary words or the garbage a combination of at least one first language or keyword model and one second language, one out-of-vocabulary model or garbage model is used in said language model underlying the recognition process. The keyword models contain and/or describe possible in-vocabulary or keywords or -phrases. The out-of-vocabulary or garbage models describe at least a part of the out of vocabulary words or phrases.

In conventional methods for recognizing speech employing a language model as described above the problems occurs that the out-of-vocabulary or garbage model and the associated grammar more often fit better than the keyword model. Therefore, in conventional methods for recognizing speech one has an increased amount of false rejected keywords as an increased number of phrases are classified as being out of the vocabulary of the keyword model.

It has therefore been suggested to introduce a penalty into the garbage model or out-of-vocabulary model to encourage and increase the recognition and output of keywords. The penalty is introduced into the calculation of the global score or likelihood of a given phrase or utterance of being contained in the out-of-vocabulary or garbage model. The so modified or penalized global score or likelihood for the garbage model is compared with the respective global scores or likelihoods for the keywords or keyword model. As the penalty decreases the global score or likelihood for the garbage model, the recognition and output for keywords is increased.

In many applications the so described word spotting procedure is too rigid as it does not consider e.g. the application situation as well as user preferences or certain details of the speech input or the recognition process per se.

It is an object of the present invention to provide a method for recognizing speech which is particular accurate and flexible.

The object is achieved by a method for recognizing speech as mentioned above according to the present invention with the characterizing features of claim 1. Preferred and advantageous embodiments of the inventive method for recognizing speech are subject of the dependent subclaims.

The inventive method for recognizing speech is characterized in that at least one variable penalty value is associated with and/or used to define the global penalty. It is therefore a basic idea of the present invention to make variable the penalty introduced into the language model and in particular to the garbage model so as to increase the keyword output. Consequently the global penalty can be adjusted to consider e.g. the recognition situation, user preferences as well as internal properties of the recognition process per se. As a result, the inventive method for recognizing speech is more flexible and more accurate with respect to prior art methods.

The global penalty can be made variable by introducing a single variable penalty value or a set of fixed and/or variable penalty values. Using a set of fixed penalty values makes the global penalty variable for instance by creating different combinations of said fixed penalty values in dependence of the recognition process per se, user preferences and/or the like.

To increase the variability of the inventive method for recognizing speech said variable penalty value is in each case dependent on or a function of the recognition process, of an user input, of a received speech phrase and/or their characteristics or the like. As a result, the variable penalty values may consider in a real-time manner actual needs of the recognition process and the application situation. By these measures the flexibility and the accuracy of the method is further increased.

In a further preferred and advantageous embodiment of the inventive method for recognizing speech at least one statistical model, a garbage model or the like is used as said out-of-vocabulary model.

It is also preferred that said out-of-vocabulary model and in particular said garbage model is chosen to contain at least a phone* grammar or the like. Using a phone* grammar ensures that any utterance being composed as a sequence of phones, phonemes, syllables or the like will fit besides the keyword model at least in the garbage model. This further ensures that for any utterance the method determines whether said utterance is recognized by being contained in the keyword model or whether it is rejected as being contained in the garbage model; there is no third possibility.

A particular simple embodiment of the inventive method for recognizing speech can be achieved by associating said variable penalty value with a transition of a recognition process to and within an out-of-vocabulary model, in particular from a keyword model. This is a very simple measure to increase the recognition and the output of keywords with respect to garbage words.

In an preferred embodiment said variable penalty is—in particular in each case—associated with a recognition step of said recognition process carried out within said out-of-vocabulary model or a garbage model and/or a recognition or processing time of said recognition process spent within said out-of-vocabulary model or garbage model. That means, that depending on the time or the number of steps the recognition process remains within the garbage model the likelihood of a recognition result within the garbage model is stronger penalized. This ensures that only for case for which any recognition result from the keyword model is beaten by a certain result in the garbage model a rejection takes place. If on the other hand a certain possibility is given for a keyword and an in-vocabulary word a keyword is output.

In a particular embodiment of the inventive method for recognizing speech a lattice structure of recognition paths or the like is used in said keyword model and/or said out-of-vocabulary or garbage model. According to this embodiment each path within the lattice is associated with a possible keyword or a garbage word, respectively. Every time the method enters a certain path to the garbage model a distinct penalty will be associated and will decrease the likelihood of the path to and within the garbage model and therefore of the certain garbage word. It is preferred to associate with at least a part of said recognition path in said lattice structure in said out-of-vocabulary model a variable penalty value in particular within the statistical information of said out-of-vocabulary model or garbage model.

In a further preferred embodiment of the inventive method for recognizing speech a Markov model, in particular a single state Markov model, is at least contained in said out-of-vocabulary or said garbage model. In that particular case a variable penalty value is associated with self-transitions of said recognition process within said Markov model.

To further increase the flexibility of the inventive method the variable penalty value is made dependent on the particular application, the application status and/or on the user preferences or the like. It is further preferred that said variable penalty value is varied interactively, in particular by a user action via a user interface.

Alternatively or additionally the flexibility and adjustability of the inventive method can be increased when said variable penalty value is hold and/or stored in an randomly accessible manner in particular within the model statistical information of the language model.

The inventive method can advantageously be realized by determining likelihoods, global scores or the like for a recognition result in said keyword model and in said out-of-vocabulary model—in particular said garbage model—the latter of which being variable penalized and by accepting recognition result for the case that a keyword model likelihood is larger than a out-of-vocabulary model likelihood. Otherwise the recognition result is rejected.

Some main aspects and properties of the method for recognizing speech according to the invention can be summarized as follows:

Conventional methods for recognizing speech employing word spotting systems aim to spot keywords inside a free vocabulary sentence. The keywords may be the words of the application vocabulary. All other words are called out of vocabulary words or garbage. A statistical model, called garbage model or the like, is trained to match all these out-of-vocabulary words.

The keyword models and garbage models are in competition in a word spotting system. The two likelihoods of the two, keyword model and of the garbage model, respectively, are compared and the one with the lower likelihood is rejected.

To increase and encourage the output of keywords a penalty is inserted. A novel and inventive aspect of the present invention is the way of determining, presenting and/or handling this penalty so as to make the keyword spotting system more accurate and flexible. A major aspect of the invention is therefore to make the penalty or the penalty value variable so as to consider further aspects of the recognition process, of the application situation, of the user preferences or the like. Therefore, the recognition process can be adapted without changing the basic algorithm or processing.

In a word spotting system the likelihood of a keyword is compared with the likelihood with a garbage word in a garbage model. The added penalty decreases the likelihood of the garbage word in the garbage model and therefore enhances the output of keywords being contained in the keyword model. In most conventional cases the penalty value is added during the transition from the keyword model to the garbage model only. If in particular a lattice structure is imagined with different paths with each path representing a possible keyword or a garbage word, every time the system follows a path to a garbage model conventionally a fixed penalty is added and decreases the likelihood of the path from the keyword model to the garbage model.

In current conventional word spotters the penalty is fixed and added only in the initial transition to the garbage model. Therefore, the system can remain for a long time inside the garbage model within so-called self-transitions, without further penalties being added to the accumulated or global store.

In contrast, the present inventive method for recognizing speech can further increase the likelihood to move out of the garbage model and to match possible keywords within the keyword model as the penalty is made variable, for instance dependent on the time of the recognition process remaining within the garbage model or the recognition step within the garbage model associated therewith.

Additionally, in conventional methods for recognizing speech and in conventional word spotting systems the designer of the method or the system fixes the penalty. In general the value of the penalty represents a compromise between the number of false accepted keywords, corresponding to a high penalty, and false rejected keywords, corresponding to a low penalty.

In contrast, in accordance with the present invention the penalty indeed may depend on the application and/or on the user preferences. For example in a conventional dialogue system with an entertainment robot a false keyword detection can result in strange actions that may also be funny, in particular in a play status. On the other hand, the user could not be in the mood to play and so wants the robot to do exactly what he asks for, in particular in the action status. According to the invention these circumstances with respect to the application situation and/or to the user preferences can be considered to change and vary the penalty and the penalty values within the garbage model to ensure an adjustment or adaptation of the penalty and the penalty values in accordance with the aim of the user and/or in accordance with the needs of the application situation.

Additionally conventional word spotting systems have the penalty values defined in a fixed manner within the underlying source code which in general is not accessible by the end user. In accordance with the present invention, the penalty can now be changed and varied by the user through an user interface to add more flexibility and achieve more new possible applications of the inventive method for recognizing speech. The penalty can therefore be easily accessed and be stored together with model statistical information in an accessible memory, for example on a hard disk or the like. As a result, existing speech recognition software may be used without changing the source code.

A further aspect of the present invention is that for each step or frame of the recognition process remaining inside the garbage or out-of-vocabulary model a certain penalty or penalty value can be added to the global score making the global penalty variable. Considering a lattice structure for the keyword and for the garbage model paths with longer stay inside the garbage model are therefore more penalized, while paths with keywords inside are more likely and therefore are output. Therefore, according to the invention the penalty depends on the time spent by the recognition process or the system inside an out-of-vocabulary or garbage model.

The method for recognizing speech according to the invention will be explained in more detail taking reference to the accompanying figures.

Figure 2:
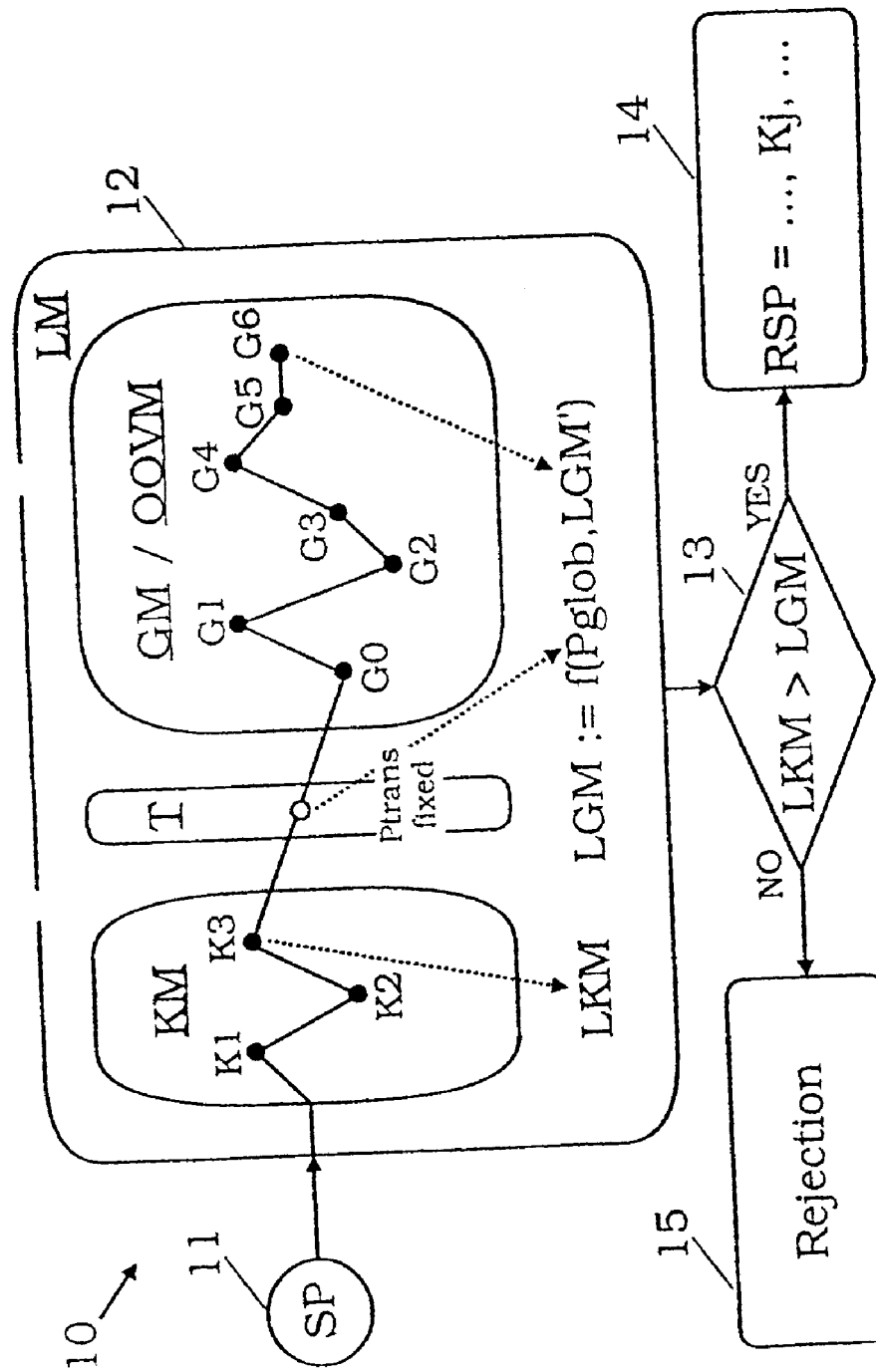
FIG. 2 is a schematical block diagram showing a conventional method for recognizing speech.

In the schematical block diagram of FIG. 2 a conventional prior art method 10 for recognizing speech based on penalized keyword spotting is shown in more detail.

In a first step 11 of said prior art method for recognizing speech a speech phrase SP is received. Said received speech phrase SP is fed into a recognition step or process 12. Based e.g. on a lattice structure of the keyword model KM and the garbage model GM or out-of-vocabulary OOVM of an underlying language model LM different paths are checked to find out whether at least one of said possible keywords K1–K3 or one of said garbage words G0–G6 do fit best to said received speech phrase SP. Likelihoods LKM and LGM' are calculated for the keyword model KM and for the garbage model GM respectively.

To calculate a penalized likelihood LGM for the garbage model GM a certain predefined function f is evaluated on the garbage model likelihood LGM' and on the fixed global penalty Pglob which is inserted into the language model LM and in particular to the garbage model GM via the transition step T and a respective and fixedly defined transition penalty Ptrans; i.e. Pglob:=Ptrans.

In a comparison step 13 it is checked whether the keyword model likelihood LKM is larger than the penalized garbage model likelihood LGM. If so, a recognized speech phrase RSP is accepted and/or output in step 14 as a sequence of recognized keywords or key phrases Kj. Otherwise, the received speech phrase SP is rejected in step 15.

Figure 1:
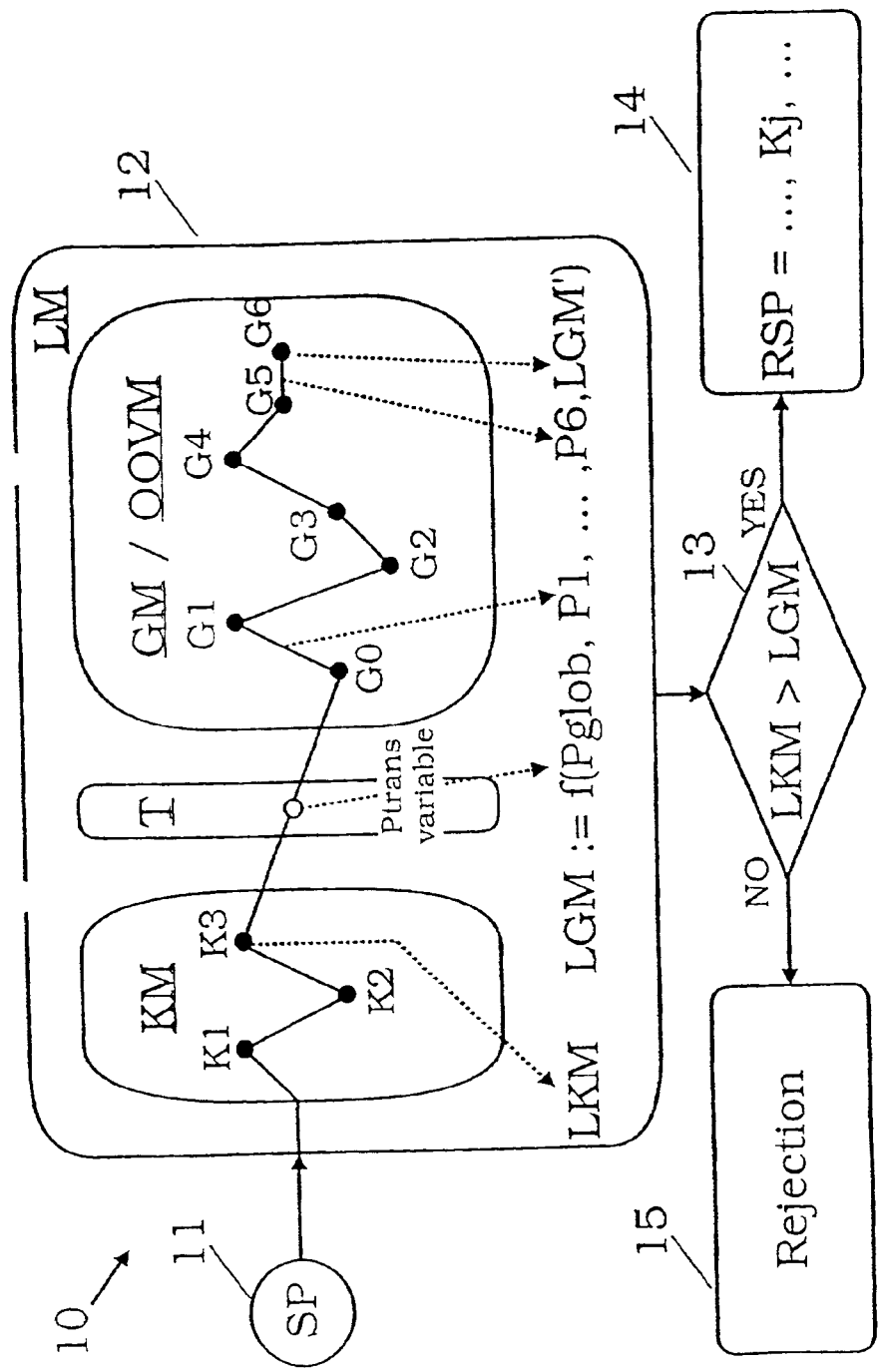
FIG. 1 is a schematical block diagram showing a preferred embodiment of the present invention.

In contrast to the prior art method shown in FIG. 2 the embodiment of the inventive method according to FIG. 1 employs variable global penalty Pglob. In the embodiment of FIG. 1 said global penalty Pglob indeed is made variable upon the variability of the functional combination of the step and/or time dependent penalties P1–P6. Additionally a transition penalty Ptrans for the transition from the keyword model KM to the garbage model GM via the transition step T may also be included and may also be variable.

The chosen numbers of seven garbage words G0–G6 on six penalties P1–P6 above is meant as an illustration only, but not as a limitation of the invention.

What is claimed is:

1. Method for recognizing speech,
   wherein at least keywords (Kj) in a received speech phrase (SP) are recognized employing a keyword spotting based recognition process (12) and a given language model (LM),
   wherein a combination of at least one first language or keyword model (KM) containing and/or describing possible in-vocabulary or keywords or phrases (Kj) and one second language or out-of-vocabulary model (OOVM) describing at least in part out-of-vocabulary words or phrases (Gj) is used as said language model (LM), and
   wherein a global penalty (Pglob) is associated to and/or introduced or inserted into said language model (LM) so as to increase the recognition of keywords (Kj),
   characterized in that
   at least one variable penalty value (Ptrans, P1, ..., P6) is associated with and/or used to define the global penalty (Pglob).

2. Method according to claim 1,
   wherein said variable penalty value (Ptrans, P1, ..., P6) is in each case made dependent on or a function of the recognition process, of an user input, of a received speech phrase (SP) per se and/or their characteristics or the like.

3. Method according to claim 1,
   wherein at least one statistical model, garbage model (GM) and/or the like is used as said out-of-vocabulary model (OOVM).

4. Method according to claim 1,
   wherein said out-of-vocabulary model (OOVM) and in particular said garbage model (GM) is chosen to contain at least a phone* grammar or the like.

5. Method according to claim 1,
   wherein said variable penalty value (Ptrans, P1, ..., P6) is associated with a transition (T) of the recognition process (12), in particular from a keyword model (KM) to an out-of-vocabulary model (OOVM).

6. Method according to claim 1,
   wherein said variable penalty value (Ptrans, P1, ..., P6) is—in particular in each case—associated with a recognition step and/or recognition or processing time of said recognition process (12) within said out-of-vocabulary model (OOVM) or a garbage model (GM).

7. Method according to claim 1,
   wherein a lattice structure of recognition paths or the like is used in said keyword model (KM) and/or said out-of-vocabulary (OQYM) or garbage model (GM).

8. Method according to claim 7,
   wherein with at least a part of said recognition paths in said out-of-vocabulary (OOVM) is associated a variable penalty value (Ptrans, P1, ..., P6), in particular within the statistical information of said out-of-vocabulary model (OOVM) or garbage model (GM).

9. Method according to claim 1,
   wherein a Markov model, and in particular a single state Markov model, is at least contained in said out-of-vocabulary model (OOVM) or garbage model (GM), and
   wherein a variable penalty value (P1, ..., P6) is associated with self-transitions of the recognition process within said Markov model.

10. Method according to claim 1,
    wherein a variable penalty value is associated with all transitions in a Markov model.

11. Method according to claim 1,
    wherein said variable penalty value (Ptrans, P1, ..., P6) is made dependent on the particular application, the application status and/or on user preferences.

12. Method according to claim 1,
    wherein said variable penalty value (Ptrans, P1, ..., P6) is varied interactively, in particular by an user action via an user interface.

13. Method according to claim 1,
    wherein said variable penalty value (Ptrans, P1, ..., P6) is hold and stored in a randomly accessible manner in particular within the model statistical information of the language model (LM).

14. Method according to claim 1,
    wherein likelihoods (LKM, LGM), global scores or the like for recognition results in said keyword model (KM) and in said out-of-vocabulary model (OOVM)—in particular said garbage model (GM)—are determined, the latter of which being variably penalized, and
    wherein a recognition result (RSP) is accepted with the keyword model likelihood (LKM) being larger than a respective out-of-vocabulary model likelihood (LGM), and is rejected as being out of vocabulary otherwise.

* * * * *